(12) United States Patent
Moisel et al.

(10) Patent No.: US 6,678,448 B2
(45) Date of Patent: Jan. 13, 2004

(54) PLUG AND RECEPTACLE FOR AN OPTO-ELECTRONIC PLUG-IN CONNECTOR SYSTEM

(75) Inventors: Jörg Moisel, Neu-Ulm (DE); Hans-Peter Huber, Neu-Ulm (DE); Manfred Rode, Senden (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 10/290,769

(22) Filed: Nov. 8, 2002

(65) Prior Publication Data

US 2003/0086664 A1 May 8, 2003

(30) Foreign Application Priority Data

Nov. 8, 2001 (DE) .......................... 101 54 834

(51) Int. Cl.[7] .......................... G02B 6/44; H01R 33/945
(52) U.S. Cl. ...................... 385/101; 439/577
(58) Field of Search .................. 439/577; 385/53, 385/39, 88, 89, 101

(56) References Cited

U.S. PATENT DOCUMENTS

| | | | | |
|---|---|---|---|---|
| 5,546,489 A | * | 8/1996 | Sasaki et al. | 385/88 |
| 5,864,128 A | * | 1/1999 | Plesko | 235/462.35 |
| 6,206,582 B1 | * | 3/2001 | Gilliland | 385/92 |
| 6,421,474 B2 | * | 7/2002 | Jewell et al. | 385/14 |
| 2003/0091304 A1 | * | 5/2003 | Tonai et al. | 385/93 |

* cited by examiner

Primary Examiner—Chandrika Prasad
(74) Attorney, Agent, or Firm—Pendorf & Cutliff

(57) ABSTRACT

The invention concerns an opto-electronic connector system with a plug 1 and a receptacle 2. The plug 1 includes a tube shaped housing 3 with an area for introduction or output of an optical signal as well as at least one opto-electronic and/or electro-optical transformer 8a, 8b and a therewith associated optical element 7 for beam guidance. Beyond this, electrical contacts 10 for input or output of an electrical signal are provided, which are connected with the one or more transformers (8a, 8b) via amplifier stage 9a, 9b. The tube shaped housing 3 is preferably in the form a cylinder or truncated cone, which engages in a corresponding recess 4 in the receptacle 2 when in the connected condition. The receptacle 2 is adapted for integration on a circuit board. The opto-electronic connector system has been found to be particularly small in its external dimensions.

13 Claims, 3 Drawing Sheets

PLUG AND RECEPTACLE FOR AN OPTO-ELECTRONIC PLUG-IN CONNECTOR SYSTEM

BACKGROUND OF THE INVENTION

1. Field of the Invention

Plug-in optical connector systems are known, in which two light guides, of which one is provided with a mechanical plug and the other is provided with a receptacle corresponding to the plug, are brought into mechanical connection and subsequently maintained in mechanical connection via a spring brace. In the connected condition optical signals can be transmitted from one light guide to the other light guide. For release, the spring brace is released and the two parts of the optical connector system are separated from each other.

2. Description of the Related Art

This type of electrical connector system is known for example from domestic applications, where a plug for a device is introduced into a receptacle of an electrical distribution network and a transmission of electrical signals or electrical energy from the receptacle to the plug is made possible. This type of system can either transmit optical or electrical signals.

From German patent DE 197 10 504 C2 an opto-electronic module is known, which includes an optical interface or disconnect point and an electrical interface or disconnect point. The interfaces are connected with each other essentially via a dimensioned quadrilateral circuit board. A range of electronic components is provided on the circuit board. The circuit board is covered over on both sides via respectively one essentially right-angled housing part. Thereby there results an opto-electronic module with substantial size.

SUMMARY OF THE INVENTION

It is the task of the present invention to provide an opto-electronic connector system with plug and receptacle, which makes possible a simple and secured mechanical connection and which makes possible a transformation of optical into electrical signals or the reverse. Therein a space saving as possible design of the connector system should be made possible.

This task is solved by a plug for an opto-electronic system with the characterizing features of claim 1, a plug receptacle for an opto-electronic connector system with the characterizing features of claim 10 as well as an opto-electronic connector system with the characterizing features of claim 14.

Advantageous further developments are the subject of the dependent claims.

The inventive plug for an opto-electronic connector system includes a tube shaped housing, in which an area is provided for the input or the output of an optical signal. In this area an optical signal can be introduced into the inside of the housing, there it is directed via an optical element which serves as a wave guide and wave deflector, to an electro-optical or opto-electronic transformer or converter. By this optical element, which is comprised or one or more optical lenses, mirrors or other optical components, it is guaranteed, that an efficient transmission of the optical signal to the opto-electronic transformer or the electro-optical transformer is accomplished through this area towards outside. Besides the transformer or transformers, there is provided within the tube shaped housing an amplifier stage for preparing the electrical signal, which on the one hand is connected to the transformer and on the other hand is connected with the electrical contacts for input or output of an electrical signal. By the inventive selection of the tube shaped housing it is made possible, with small external dimensions, to make available a sufficient volume for arrangement or provision of the components necessary for a reliable transformation of the optical into electrical signals or the reverse.

As electro-optical transformer LEDs, laser diodes or other light emitting diodes can be utilized, while as opto-electronic transformers, photo or PIN diodes can be employed. Besides the diodes, also suitable would be appropriate transistor devices. Preferably these transformers are in the form of unhoused diodes or transistors and are connected electrically by means of bond techniques. Thereby it is made possible to keep the required volume in the tube shaped housing in the area of the input or the output of the optical signal as small as possible and thereby to keep the external dimension of the connector as small as possible.

Besides this it is possible, in addition to an amplification stage, also to provide further electrical switch or circuit components, such as for example the decoders, equalizers or rectifiers, noise suppression stages or drivers, which make possible the reliable and efficient operation of the plug with its transformer function for optical into electronic signals and/or the reverse.

Preferably, on the outside of the tube shaped housing, mechanical guide elements are provided, which enable a reliable guided introduction of the tube shaped housing into the receptacle, wherein by appropriate selection of the guide elements there is provided protection against incorrectly rotated insertion. Preferably the guide elements are provided with detent elements, in particular with spring loaded detent elements, so that a detention of the plug in the appropriate receptacle is made possible and an undesired releasing of the connector system is prevented even in the case of impact or damage.

It is of advantage, when the tube shaped housing is shaped cylindrically or truncated conically, since thereby in particularly advantageous manner the possibility is provided, given the predetermined internal volume, to provide very limited external dimensions of the housing of the plug. By the narrowing or tapering design of the tube with a truncated conical design of the housing an introduction of the plug into an associated receptacle is made easier by the aligning effect and the associated focusing of the plug in the corresponding recess of the receptacle. Thereby a simplified manipulation of the opto-electronic connector system including a secure or reliable design of the connector system with respect to the plug is made possible.

According to a particularly preferred design of the invention the electrical contacts or as the case may be the area for introduction or output of the optical signals is provided in the area of the end surfaces of the tube shaped housing. Thereby the electrical contacts extend through the planar end surfaces. Therein it has been found to be a particularly desirable design, when the electrical contacts are integrated in the end surface, while in the other oppositely lying end surface the area for the introduction or as the case may be output of the optical signal is integrated. Thereby, a very slender plug is provided. By the spatial breakdown therein of the functional areas, in particular by the opposing arrangement of the optical or as the case may be electrical inputs or as the case may be outputs, it is made possible, to provide a very reliable and efficient construction of the plug with the transformer function from optical into electrical or as the case may be the reverse signals. By this slender design with the tube shaped housing a good manipulability of the plug for an opto-electronic connector system is provided.

If this arrangement of the contacts and the area for the input or as the case may be output of the optical signal follows standardized fixed dimensions, for example according to the industrial standards, such as DIN 42162, then it is made possible to create a universally employable connector system, which on the basis of the standardization can be widely used independent of the location of employment. By the widespread utilization of the standards a connection of the plug in other stationary receptacles in a different location is possible without difficulty and thereby a particularly simple and reliable operation of the connector system is achieved.

It has been found to be particularly preferable, to spatially separate the electrical contacts and the amplification stage from each other, and to separate the zones of the components of the plug which conduct the optical signals, that is, in particular, the area for the introduction or as the case may be output of the optical signals, the optical element and the optical electronic or as the case may be the electro-optical transformer, from the components for the electrical signals, meaning in particular the electrical contacts and the amplification stages. By this arrangement of the components of the plug for an opto-electronic connector system it is made possible to achieve a very efficient utilization of the space in the inside of the tube shaped housing, by which it is made possible to maintain the external dimensions of the plug as small as possible and thereby make possible the employment of the opto-electronic connector system even in demanding environmental conditions for example in an automobile or a airplane.

It has been found to be particularly advantageous to maintain components spatially separated from each other in a plug with at least one opto-electronic and one electro-optical transformer with associated amplification stages for preparing the electrical signal. Besides this, it has been found to be advantageous, in addition to the spatial separation, to provide shielding, for example a sheet metal shield, which is provided between the transformers and the associated amplification stages and is grounded, whereby the cross-over influencing of the electrical signals are substantially not influenced by electro-magnetic interference of the respective other signals. It has in particular been found to be advantageous to partially divide the internal space of the tube shaped housing by introduction of a longitudinally running sheet metal shield and to use the two resulting partial spaces for separation of the two oppositely running signal flow paths. Preferably, this separation does not extend out all the way to the area of the optical element or as the case may be all the way to the area of the mounting or reception of the light wave guide and in certain cases not to the area of the transformer, so that the area of the components of the plug, through which the optical signals are conducted, are unitary signal segments. In this area there is not concern over an influencing of the optical signals. Thereby it is made possible to provide an interference-free plug for an opto-electronic connector system.

Preferably the plug is provided with a converging lens as its optical element, which is separation from the opto-electronic transformer by its design or focal index and is so dimensioned and arranged, that it focuses the incoming optical signals as nearly completely as possible onto the opto-electronic transformer. Thereby a very good degree of efficiency for the transmission of the optical signal from a receptacle to the plug via the optical element onto the opto-electronic transformer for transformation into an electrical signal is achieved. Thereby it is made possible to keep the individual components, in particular the effective surface of the opto-electronic transformer, to as small as possible and therewith as economical as possible. The plug and the therewith associated connector system demonstrates itself to be very suitable for mass production and employment, in particular under demanding conditions, in particular in the automobile industry or in the high frequency or communication technology.

According to an alternative preferred embodiment of the plug, the optical element is designed and arranged in the shape of a converging lens such that the optical signal given off by the opto-electronic transformer is received by the converging lens and is so redirected that it is given off as an optical signal with essentially parallel beam path from the plug. By the widened, parallel beam path of the emitted optical signal it is made possible to provide a free beam transmission segment, which makes possible a transmission of the optical signal from the plug into the associated receptacle even under demanding conditions. In particular a poor connection of plug and receptacle or, as the case may be, manufacturing tolerances of the plug or the receptacle or, as the case may be, a misalignment, has only minimal influence on the transmission quality due to the selection of a free beam segment which is essentially not widening or narrowing.

According to another preferred embodiment of the inventive plug a recess is provided in the area of the input or output of the optical signal, which is suitable or capable of receiving a light guide, via which the optical signal can be input or output. Therein the receptacle is so designed, that it conforms or is adapted to the light guide. By this adaptation it is ensured, that the light guide, by means of the receptacle, is brought to lie in a predetermined position in the housing of the plug and thereby is so positioned that an optimized coupling-in of the optical signal from the plug into the light guide or the reverse is accomplished. By the adaptation of the receptacle, in particular by the adaptation or conforming of the dimensions of the receptacle-forming recess to the dimensions of the light guide, it is further ensured, that an undesired slipping out of the light guide, in particular during upheavals, is prevented. This can in particular be ensured by provision of thickenings and appropriate recesses in the light guide or as the case may be the plug in the area of the receptacle.

In accordance with the invention the plug receptacle for an opto-electronic connector system is provided with a recess, which corresponds with the tube shaped housing of an inventive plug to the extent, that a form-fitting reception of the plug in the receptacle is made possible. Preferably guide elements or recesses or projections are provided on the outer side of the housing of the plug, which correspond with appropriate guide elements, recesses or projections on the inner side of the receptacle and thereby make possible a targeted, in particular rotationally correct introduction of the inventive plug into the inventive receptacle. Preferably the recesses are so designed, that they provide for a detention, in particular by spring loaded guide elements. Thereby a secure connection or the case may be a secure reception of the plug in the receptacle is accomplished even under demanding environmental conditions due to upheavals, impacting or the like. Preferably the receptacle for the opto-electronic connector system is provided with a recess, which corresponds with the tube shaped housing of the plug of the opto-electronic connector system, and with an optical element, which makes possible the transmission of an optical signal over the free beam segment with essentially parallel beam propagation between the optical element of the receptacle and the optical element of the plug. For this the optical element, which preferably includes a converging lens, is so designed, that it cooperates with a light source such that the light signal emitted by the light source is so broken by the optical element, that the optical signal is propagated essentially along a parallel beam path in the direction of the area for supplying the optical signal in the inventive plug. Beyond this, it is possible to so utilize the arrangement, that the optical signal from the plug, which meets on the optical element in an essentially parallel beam path, is so bundled or collumated, that it impacts on a light guide or on a micro-mirror for coupling into a light guide or an optical backplane. Therein the optical elements both in the plug as well as in the receptacle are so selected that they achieve a parallel beam path of the light with a beam diameter of a few millimeters. Thereby a very reliable transmission of the optical signal is accomplished secure against undesired misalignment of the components of the opto-electronic connector system.

It has been found to be particularly advantageous to provide a receptacle for not only the accommodation of one plug, but rather for receiving multiple plugs, wherein it has been found to be particularly advantageous, to provide the recesses in a row, since thereby a particularly simple introduction of individual inventive plugs in the inventive receptacle with the recesses provided in a row is made possible. This simplified manipulation or operation of the connector system is thereby simplified, that each recess is accessible from two sides, without influence on the adjacent recesses. Thereby it becomes possible to provide a spatially very compact arrangement of the connector receptacle with multiple integratable plugs. Preferably, multiple inventive plugs are so integrated into a unit, that a common insertion into the receptacle with its recesses provided in a row is made possible.

It has been found to be particularly advantageous to so design the receptacle that it can be secured to a circuit board in simple manner, for which in particular locking connectors or screw connectors are suitable. This manner of the securing onto a printed circuit board has been found to be particularly preferred in a receptacle for the reception of multiple plugs, whereby with few manipulation steps a very reliable securing of the connector system with multiple plugs on a printed circuit board is accomplished and therewith a very secure connecting and transforming of multiple optical signals into electrical signals with transmission on the printed circuit board.

It has been found to be particularly advantageous when the inventive plugs are combined into an opto-electronic plug system with the corresponding receptacles. Therein it is also possible to provide the receptacles universally also with a receptacle purely for an electrical plug with a corresponding tube shaped housing. Thereby the universal employment of this opto-electronic connector system is achieved in significant measure, since it is universally particularly suitable to integrate its mechanical structure and the electrical connection contacts on a circuit board.

BRIEF DESCRIPTION OF THE DRAWINGS

In the following the present invention is described in greater detail on the basis of the figures.

DETAILED DESCRIPTION OF THE INVENTION

Figure 1:
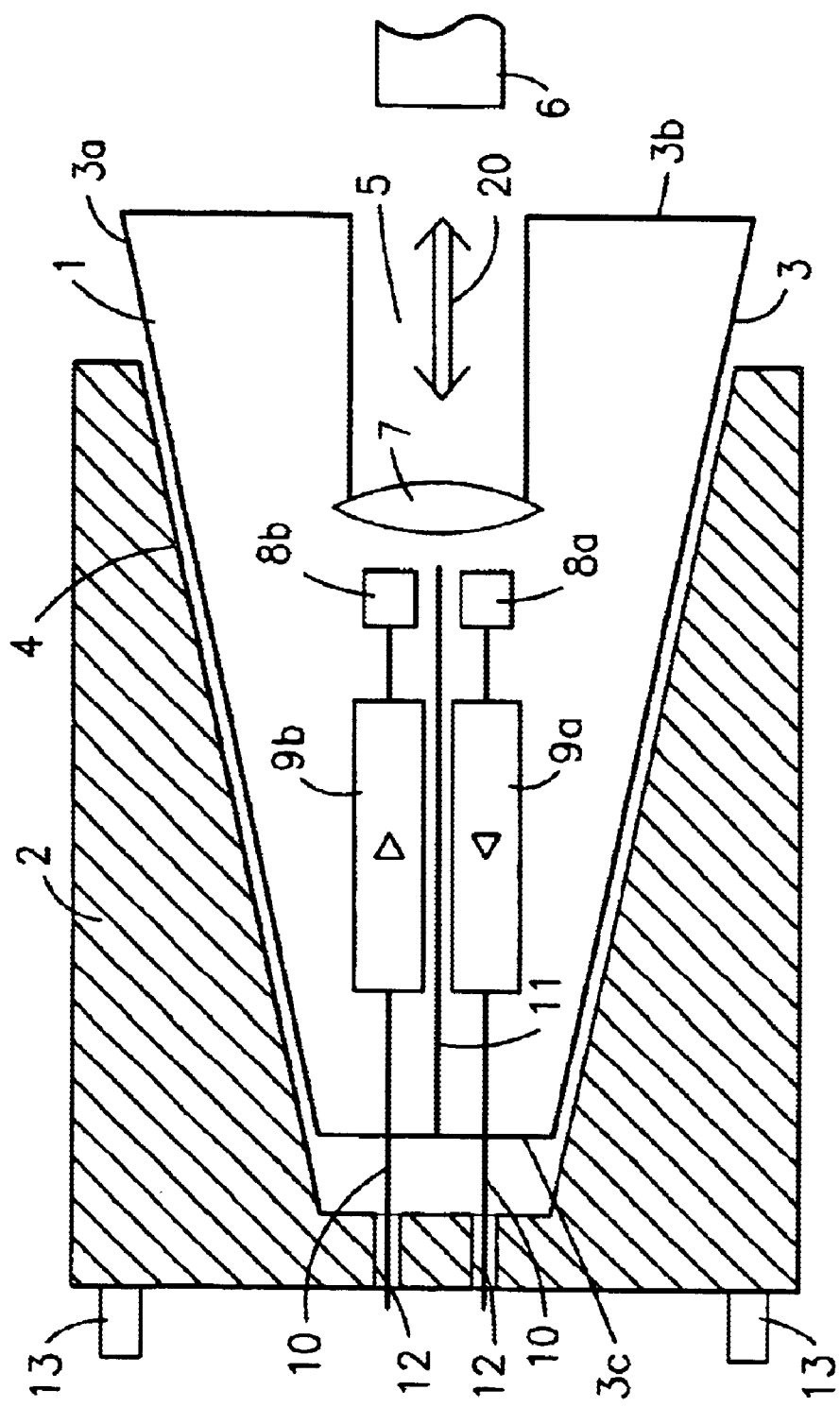
FIG. 1 shows a longitudinal section through a plug, which is introduced in a receptacle for an opto-electronic connector system.

FIG. 1 shows a longitudinal section through a plug 1 for an opto-electronic connector system with a receptacle 2. The plug 1 has a tube shaped housing 3, which is shaped truncated conically. This includes a housing or external surface 3a and the two end surfaces 3b and 3c. The end surface 3b is interrupted by a void 5, which in the area 5 forms an inlet for receiving the optical signal. The optical signals are fed into the plug 1 in the area 5, or are here output therefrom. The optical signals introduced into the plug with essentially parallel beam path meet an optical element 7, which is part of the housing 3 and defines a border threreof and is shown as a converging lens 7. The converging lens 7 is so selected and provided, that the optical signal provided to the plug 1 with essentially parallel beam path impinges essentially over the entire surface of the opto-electronic transformer or converter 8a, which transforms the impinging light of the optical signal into electrical signals and supplies these to the amplifier 9a. In the amplifier 9a these supplied electrical signals are amplified, decoded and by suitable measures, at least partially, freed of white noise. These electrical signals are then supplied to the electrical contacts 10 of the plug 1.

Electrical signals are provided to the plug 1 via other electrical contacts 10, which are supplied to the amplifier 9b, which prepares the signals for the transformation into optical signals, in that they are converted or transformed to the appropriate voltage level or as the case may be the appropriate signal shape, in order to be able to then subsequently supply these to the electro-optical transformer 8b. This transforms the supplied electrical signals into optical signals, which are emitted in the direction of the light guide 6 and are so guided by the optical element 7, that they are coupled into the end of the light guide 6.

The opto-electronic transformer is in the form of an unhoused PIN-diode, which is mounted on a carrier and is connected to the amplifier via bond wires. The corresponding electro-optical transformer 8b is in the form of a laser diode, which likewise is in the form an unhoused bonded diode. By the provision in the form of an unhoused diode it is accomplished that the construction measurements are maintained very small and a compact unit is formed of transformer 8a, 8b and optical unit 7 and light guide 6 in the receptacle 5.

The amplifiers 9a and 9b are preferably directly connected to the transformers 8a, 8b in the form of chip bonded dies. In particular, these are provided on the same carrier. Thereby it is again achieved, that the required construction mass is reduced and this is securely incorporated in the tube shaped housing 3 of the plug 1. Thereby it is accomplished, that the external dimension of the plug 1 are maintained small. It is possible, through this design or arrangement, to achieve a plug 1 with a diameter of a few millimeters.

The opto-electronic transformer 8a and the amplifier 9a are provided on a common carrier and are provided spaced from the other opto-electronic transformer 8b and amplifier 9b provided in common upon another carrier in the housing 3. Between these a shield 11 is provided, which is grounded. Thereby it is accomplished, to prevent a cross-over interference or influencing of the other side by the electrical signals and thereby the quality of the signal transmission is maintained high. The shielding 11 separates the areas of the electrical signal transmission, however does not separate in the area of the optical signal transmission in the plug 1. The optical signals are transmitted without hindrance by the shield 11 between the light guide 6 and the transformers 8a and 8b. By the suitable selection of the optical element 7 the interference freedom of the optical transmission from the transformer to the light guides and the reverse is ensured.

The tube surface 3a and housing 3 of the plug correspond with the recess 4 of the receptacle 2 to the extent, that in the assembled or connected condition the plug 1 lies with its surface against the receptacle 2. The electrical contacts 10 extending beyond the end surface 3c of the plug 1 engage in associated holes of the receptacle 2. The position of the holes is so selected, that a secure electrical contacting of the contact surfaces 12 provided at the wall of the holes with the electrical contacts 10 is ensured. The contact surfaces 12 are connected with appropriate transmission points to a circuit board, by which a reliable contacting of the receptacle to a circuit board is achieved. In order to make possible a reliable mechanical connection of the receptacle 2 with the circuit board, pins 13 are provided on the side of the receptacle 2 opposite the recess 4, which engage in appropriate holes of the circuit board and achieve or form with them an engaging or detent position.

By the conical decreasing shape of the housing 3 of the plug 1 and the corresponding recess 4 of the receptacle 2 a simple and reliable insertion of the plug 1 into the receptacle 2 is made possible. This is possible even in the case that, as in the present invention, the external dimensions of the plug 1 or as the case may be receptacle 2 is in the realm of only a few millimeters.

Figure 2:
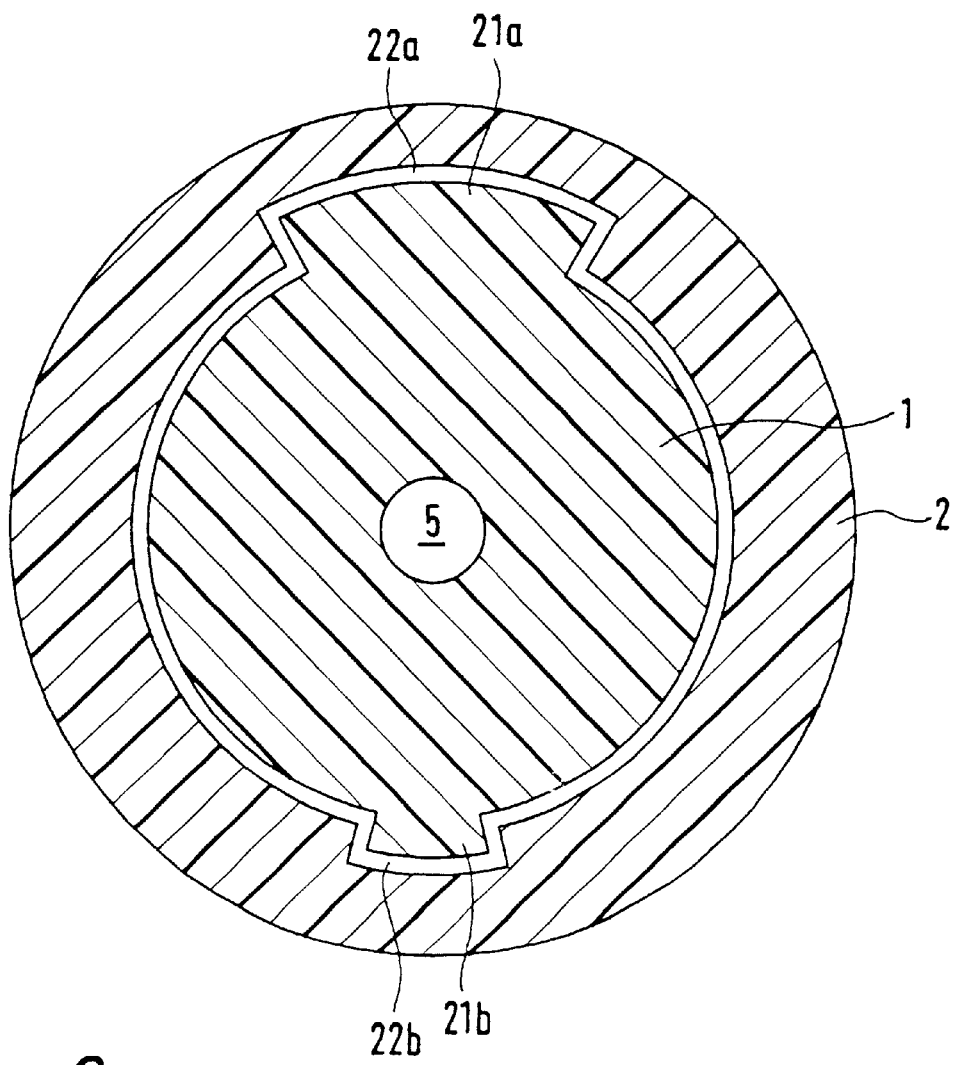
FIG. 2 shows a cross-section through a different plug for an opto-electronic connector system which is introduced in a corresponding different receptacle.

In FIG. 2 a cross-section through a different plug 1 in a different receptacle 2 is shown. The plug 1 has a cylindrical shaped tubular housing, which includes two projecting parts 21a and 21b. These projections 21a and 21b are of different size. They extend in the longitudinal direction of the housing and cover a substantial part of the cylindrical housing of the plug 1. In the receptacle 2 there are corresponding recesses 22a and 22b corresponding to these projections 21a and 21b. These correspond in their size and shape to the projections 21a and 21b of the plug 1. By this differentiated design of the projections 21a and 21b and the associated recesses 22a and 22b it is accomplished, that the insertion of the plug 1 in the receptacle 2 cannot occur when improperly rotated. Thereby it is accomplished, that the electrical contacts of the plug 1 and the light guides in the receptacle 5 are always brought into the predetermined position, which would guarantee a reliable electrical contact and optical connection. This is particularly important for the employment of the opto-electronic connector system comprising plug 1 and receptacle 2.

Figure 3:
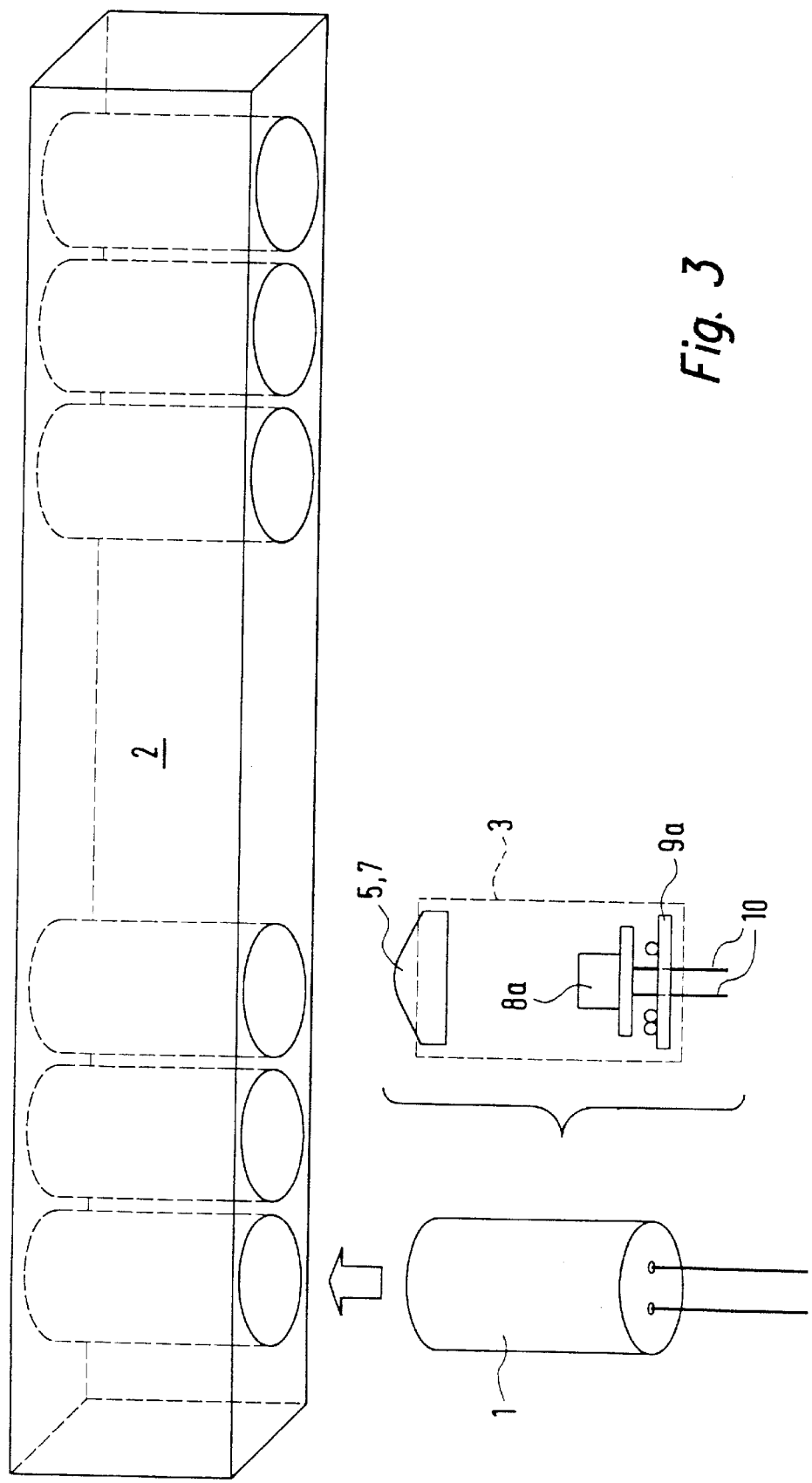
FIG. 3 shows a different plug for an opto-electronic connector system with a corresponding different receptacle.

In FIG. 3 a schematic representation of an exemplary plug 4 of an opto-electronic connector system is shown, which can be introduced into a receptacle. The plug 1 has a cylindrical housing, wherein electrical contacts extend through it's end surface. The receptacle 2 includes a row of recesses 4 for receiving plugs 1, which are cylindrical shaped and correspond with the housing of the plug 1. This means that the plug 1 can be introduced in the receptacles 4, without any tilting or play being provided between the plug 1 and the receptacle 2. Thereby a very reliable guiding and positioning of the plug 1 and the receptacle 2 is provided.

By the provision of the plurality of recesses 4 along a row in an essentially quadratic receptacle 2 it is accomplished that it is made possible to introduce multiple plugs 1 of the opto-electronic connector system and realize a reliable contacting. The receptacle 2 is preferably mounted on a circuit board with not shown mounting means, for example screws or rivets. Therewith it is accomplished, with few mounting elements, to bring a plurality of plugs 1 and receptacles 4 into connection with each other.

Besides the schematic representation of the external design of the plug 1, the internal design is schematically represented. Via the electrical contacts 10 the electrical signals are supplied to the plug 1. These are amplified in the amplifier 9 and adapted for a transformation into optical signals. Finally the amplified and adapted electrical signals are supplied to a photodiode 8a, which acts as electro-optical transformer. The photodiode 8a exhibits a typical round light emitting surface with a diameter of few 100's of micrometers. From the photodiode 8a a light is emitted in the direction of the area 5 for emitting an optical signal. In this area 5 a converging lens 7 is provided as optical element for bundling the optical signal emitted from the photodiode 8a. The converging lens 7 has a typical diameter in the multiple's of millimeters. In its light emission and its distance from the photodiode 8a it is so arranged and provided, that the light signal emitted from the photodiode 8a is so directed by the converging lens, that light signals are emitted from the plug with an essentially parallel beam. The light beam typically has a diameter of a few millimeters. By this design of the plug with the converging lens 7 in the area of the end surface of the cylindrical housing 3 it is accomplished that a very reliable and efficient coupling of the emitted light signals into a receptacle irrespective of whether a light guide or an optical back plate is made possible. Thereby it is accomplished, by the widening of the essentially parallel light beam from the plug 1, to preclude or at least substantially minimize interruptions or disturbances or negative influences on the efficiency of the optical transmission of the signal due to construction tolerances or other factors, in particular thermal factors, changes in dimensions or other associations of the appropriate components to each other.

In the connected condition, that is, in the condition of the inserted plug 1 in the recess 4 of the receptacle 2, there is impinged upon the back side of the receptacle 2 an optical signal, which impinges upon an optical element, which makes possible a reliable coupling in of the optical signal, in particular in an optical plane, preferably in connection with a micro-mirror. In this case the receptacle 2 ensures the axial mechanical arrangement of the photodiode 8 to the converging lens 7 and via the housing 3 with the recess 4 of the receptacle 2, which is connected with a circuit board with optical back plane, for the optical transmission path of the optical back plane. This arrangement makes possible a universal flexible connection and separation of the different components of an opto-electronic connector system with the therewith associated electronic components or, as the case may be, the therewith connected optical components.

What is claimed is:

1. A plug (1) for an opto-electronic connector system with a tube shaped housing (3), which includes an area (5) for input or output of an optical signal (20), wherein in the area (5) an opto-electronic or electro-optical transformer (8a, 8b) is provided and between the area (5) and transformer (8a, 8b) an optical element (7) adapted for guiding the optical signal (20) is provided, and including an electrical contact (10) for input or output of an electrical signal, wherein these contacts (10) or transformers (8a, 8b) are associated or provided with an amplification stage (9a, 9b) for preparing the electrical signal, wherein at least one opto-electronic and one electro-optical transformer (8a, 8b) are provided with associated amplifiers (9a, 9b) for preparing the electrical signal, and wherein these are provided spatially separated from each other or shielded from each other in the housing (3).

2. The plug according to claim 1, wherein mechanical guide elements (21a, 21b) are provided on the outside of the tube shaped housing (3).

3. The plug according to claim 1, wherein the housing (3) is cylindrical or is truncated conically.

4. The plug according to claim 1, wherein the area (5) and/or the electrical contacts (10) are provided at one end surface (3a, 3b) of the tube shaped housing (3).

5. The plug according to claim 1, wherein the area (5), the opto-electronic or electro-optical transformer (8a, 8b) and the optical element (7) for beam guidance are provided spatially separated from the electrical contacts (10) and the amplification stage (9a, 9b) in the housing (3).

6. The plug according to claim 1, wherein in the area (5) for input or output of an optical signal a converging lens is so provided as optical element (7), that an optical signal impinging with parallel beam is focused upon the opto-electronic transformer (8a).

7. The plug according to claim 1, wherein in the area (5) for input or output of an optical signal a converging lens is so provided as an optical element (7), that an optical signal emitted from the electro-optical transformer (8b) is emitted from the plug as an essentially parallel beam.

8. The plug according to claim 1, wherein the area (5) for input or output of an optical signal is provided with a receptacle for a light guide, via which an optical signal can be introduced or output.

9. A receptacle for an opto-electronic connector system, wherein it includes a recess (4) adapted for mating engagement with the tube shaped housing (3) of the plug (1) according to claim 1.

10. The receptacle for an opto-electronic connector system, wherein it includes a recess (4), which corresponds with the tube shaped housing (3) of the plug (1) according to claim 6, and wherein it includes an optical element for emitting or for receiving an optical signal with essentially parallel beams.

11. The receptacle according to claim 9, wherein it includes multiple recesses (4) arranged in a row for receiving more than one plug (1) according to claim 1.

12. The receptacle according to claim 9, wherein it is adapted for mounting onto circuit boards.

13. An opto-electronic connector system including:
   a plug (1) with a tube shaped housing (3), which includes an area (5) for input or output of an optical signal (20), wherein in the area (5) an opto-electronic or electro-optical transformer (8a, 8b) is provided and between the area (5) and transformer (8a, 8b) an optical element (7) adapted for guiding the optical signal (20) is provided, and including an electrical contact (10) for input or output of an electrical signal, wherein these contacts (10) or transformers (8a, 8b) are associated or provided with an amplification stage (9a, 9b) for preparing the electrical signal,
   wherein at least one opto-electronic and one electro-optical transformer (8a, 8b) are provided with associated amplifiers (9a, 9b) for preparing the electrical signal, and wherein these are provided spatially separated from each other or shielded from each other in the housing (3), and
   a receptacle (2) including a recess (4) adapted for mating engagement with the tube shaped housing (3) of the plug (1).

* * * * *